United States Patent [19]

Walp

[11] Patent Number: 5,097,487
[45] Date of Patent: Mar. 17, 1992

[54] LOCAL OSCILLATOR SIGNAL GENERATING SYSTEM FOR DIGITAL DEMODULATOR

[76] Inventor: Patrick K. Walp, 540 Denman Rd., Penngrove, Calif. 94951

[21] Appl. No.: 427,281

[22] Filed: Oct. 24, 1989

[51] Int. Cl.$^5$ .................... H04L 27/06; H04L 27/16
[52] U.S. Cl. .................................... 375/97; 375/85; 329/350; 455/257
[58] Field of Search ............ 375/97, 98, 39, 85, 375/86; 455/257, 259, 260, 264, 265; 370/110.2; 328/14; 364/721; 329/358, 350, 313, 321; 331/1 R, 1 A

[56] References Cited

U.S. PATENT DOCUMENTS

| | | | |
|---|---|---|---|
| 3,368,036 | 2/1968 | Carter et al. | 375/85 |
| 4,295,098 | 10/1981 | Crowley | 328/14 X |
| 4,328,555 | 5/1982 | Mantione | 328/14 X |
| 4,344,176 | 8/1982 | Qureshi | 375/15 |
| 4,535,459 | 8/1985 | Hogge, Jr. | 375/80 |
| 4,625,180 | 11/1986 | Kamakura et al. | 331/2 |
| 4,649,551 | 3/1987 | Sander et al. | 375/81 |
| 4,667,170 | 5/1987 | Lofgren et al. | 331/17 |
| 4,677,395 | 6/1987 | Baker | 331/25 |
| 4,689,581 | 8/1987 | Talbot | 331/1 A |
| 4,712,077 | 12/1987 | Ansell et al. | 331/25 |
| 4,809,306 | 2/1989 | Somer | 375/120 |

OTHER PUBLICATIONS

"Carrier Synchronization and Detection of QASK Signal Sets", by Simon and Smith, IEEE Tran. on Comm., vol. 22, Feb. 1974, pp. 98-106.
"Offset Quadrature Communications with Decision-Feedback Carrier Synchronization", by Simon and Smith, IEEE. Tran. on Comm., vol. 22, Oct. 1974, pp. 1576-1584.
"A Bandwidth Compressive Modulation System Using Multi-Amplitude Minimum Shift Keying (MAMSK)", by Weber et al., IEEE Tran. on Comm., vol. 26, 1978, pp. 543-551.

*Primary Examiner*—Benedict V. Safourek
*Assistant Examiner*—Tesfaldet Bocure

[57] ABSTRACT

A digital demodulator or receiver (22) having an interface (24) for receiving an input signal modulated with digital data, a multiplier (36) for multiplying the input signal with a local oscillator signal (LO) to generate a product signal, and an integrator (38) for periodically integrating the product signal to generate a sequence of integrated signals, each having an amplitude indicative of a respective portion of the digital data, additionally includes a circuit (30, 32) for directly generating a plurality of logic signals and a summer (34) for summing the logic signals to directly synthesize the local oscillator signal (LO). The local oscillator signal (LO) thereby produced has a fundamental component and third and fourth harmonic components and is shaped to ensure that each of the third and fourth harmonic components has an amplitude substantially less than that of the fundamental component. The disclosed circuit includes a reset mechanism (RESYNC) which quickly adjusts phase of the local oscillator signal (LO) by modifying the phase of the directly generated logic signals.

18 Claims, 13 Drawing Sheets

LOCAL OSCILLATOR SIGNAL GENERATING SYSTEM FOR DIGITAL DEMODULATOR

BACKGROUND OF THE INVENTION

This invention relates to a system for generating a local oscillator signal in a digital demodulator of the type comprising means for receiving an input signal modulated with digital data, means for multiplying the input signal with a local oscillator signal to generate a product signal, and means for periodically integrating the product signal to generate a sequence of integrated signals, each having an amplitude indicative of a respective portion of the digital data.

Digital demodulators of the general type described above are well known to those skilled in the art, as for example in quadrature amplitude modulation (QAM) systems. Typically, a plurality of separate component signals are combined to form a composite signal which is transmitted on a single signal channel, and each signal is orthogonal to the others and is amplitude modulated. When the received composite signal is multiplied by an appropriate local oscillator signal and the resulting product is integrated over an integral number of symbol periods, the resulting integration is indicative of the amplitude of a respective one of the component signals of the composite signal.

Preferably, each of the component signals is amplitude modulated with a sine wave of half the data symbol rate, phased such that the amplitude is zero at the beginning and end of each symbol. This reduces the spectrum created by the data transitions on the symbol boundaries. For this reason, the local oscillator signals are also often sinusoidally varying.

In the past, such sinusoidally varying local oscillator signals have been generated by integrating square wave signals. This approach yields an adequate approximation of a sine wave signal; however, it suffers from the disadvantage that the phase of the local oscillator signal cannot be reset at high speed, because the local oscillator signal is generated in an integration operation. In many applications it is important that a digital demodulator of the type described above be able to shift the phase of the local oscillator signal rapidly, as for example when an input signal of previously unknown phase is acquired. In these situations, the integration approach to generating a local oscillator signal may unacceptably reduce the speed with which the input signal can be acquired.

Another approach of the prior art is to store a desired local oscillator signal in read only memory and then to apply the output of the read only memory to a digital to analog converter for conversion to an analog signal that is used as the local oscillator. The use of such a read only memory allows the phase of the local oscillator signal to be changed rapidly. However, this approach requires hardware which is relatively high-speed and complex.

A need presently exists for an improved apparatus for generating a local oscillator signal in a digital demodulator of the type described above, which allows the phase angle of the local oscillator signal to be adjusted rapidly, and which can be implemented simply and economically. In many applications it is important that such a local oscillator signal be shaped to ensure that third and fourth harmonic components are substantially reduced in amplitude as compared with the fundamental component of the local oscillator signal.

SUMMARY OF THE INVENTION

According to this invention, an improvement is provided to a digital demodulator of the type described initially above. This improvement comprises means for directly generating a plurality of logic waveforms, each having a respective phase, along with means for summing the logic waveforms to directly synthesize the local oscillator signal. The local oscillator signal has a fundamental component and third and fourth harmonic components, and the directly generating means and combining means are operative to ensure that each of the third and fourth harmonic components has an amplitude substantially less than that of the fundamental component. Means are provided for quickly adjusting the phase of the local oscillator signal by modifying operation of the directly generating means to alter the phases of the logic waveforms.

Because the local oscillator signal is synthesized from component logic waveforms, the phase of the local oscillator signal can readily be adjusted in a high speed manner. In effect, the directly synthesized local oscillator signal substitutes for a conventional, sinusoidally varying local oscillator signal, and approximates such a sinusoidally varying signal in a way that minimizes or eliminates undesired harmonic components. In this way the need for integration circuits, read only memories, and digital to analog converters is eliminated, while the essential characteristics of the desired local oscillator signal are obtained.

DETAILED DESCRIPTION OF THE PREFERRED EMBODIMENTS

Figure 1:
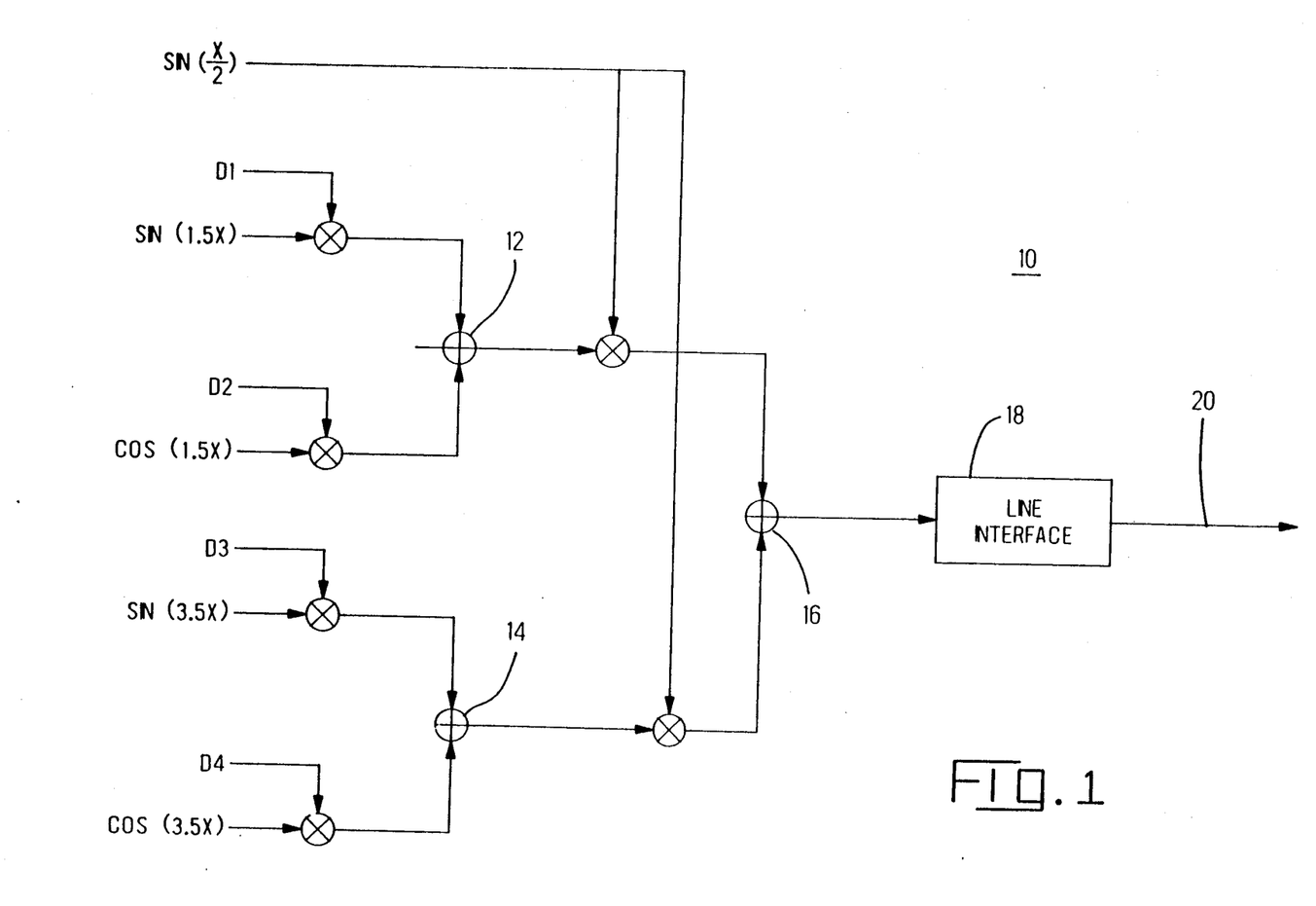
FIG. 1 is a block diagram of a transmitter for a dual carrier 16 QAM modem suitable for use with the preferred embodiment of this invention.

FIG. 1 shows a block diagram of a dual carrier transmitter 10 suitable for use with the receiver described below. The transmitter 10 receives four data input signals D1, D2, D3, D4. Each of these data input signals is a four level signal (+3, +1, −1, −3) and can be considered as encoding two bits, a sign bit and a magnitude bit. The transmitter 10 also receives five modulating signal inputs. The data signals D1 and D2 are multiplied by respective sine and cosine signals sin(1.5x) and cos(1.5x). In FIG. 1, x is equal to $2\pi t/T_s$. In this example $T_s$ is equal to 800 nanoseconds. The data signals D3 and D4 are multiplied by respective modulating signals sin(3.5x) and cos(3.5x). In each case the data signal retains its value throughout any given transmitted symbol period. This period is equal to $T_s$, and during this period x varies from 0–2. The two lower frequency signals are summed at a summing junction 12 and the resulting signal is then multiplied with an envelope signal sin(x/2). Similarly, the two higher frequency signals are summed at a summing junction 14 and then multiplied by the envelope signal. The resulting signals are then summed in a third summing junction 16 to form a composite signal which is applied via a line interface 18 to a transmission medium such as a twisted pair 20.

It should be noted that the four modulating signals sin(1.5x), cos(1.5x), sin(3.5x), cos(3.5x) and the envelope signal sin(x/2) do not need to be adjusted in phase rapidly, and for this reason can be generated in a conventional manner, for example by shaping digitally generated square wave signals using standard integration and soft limiting techniques. Because each of the four components encodes one of four levels, the resulting composite signal can be characterized as a 16 quadrature amplitude modulated (16QAM) signal. The modulating signals at 1.5x and 3.5x are suppressed carriers, and the envelope at x/2 creates two side bands for each suppressed carrier. Thus, the composite signal is characterized by a frequency spectrum emphasizing the frequencies $1\times, 2\times, 3\times$ and $4\times$. The transmitter 10 does not per se perform part of this invention, and it has been described only to clarify the environment in which the present embodiment is used.

Figure 2:
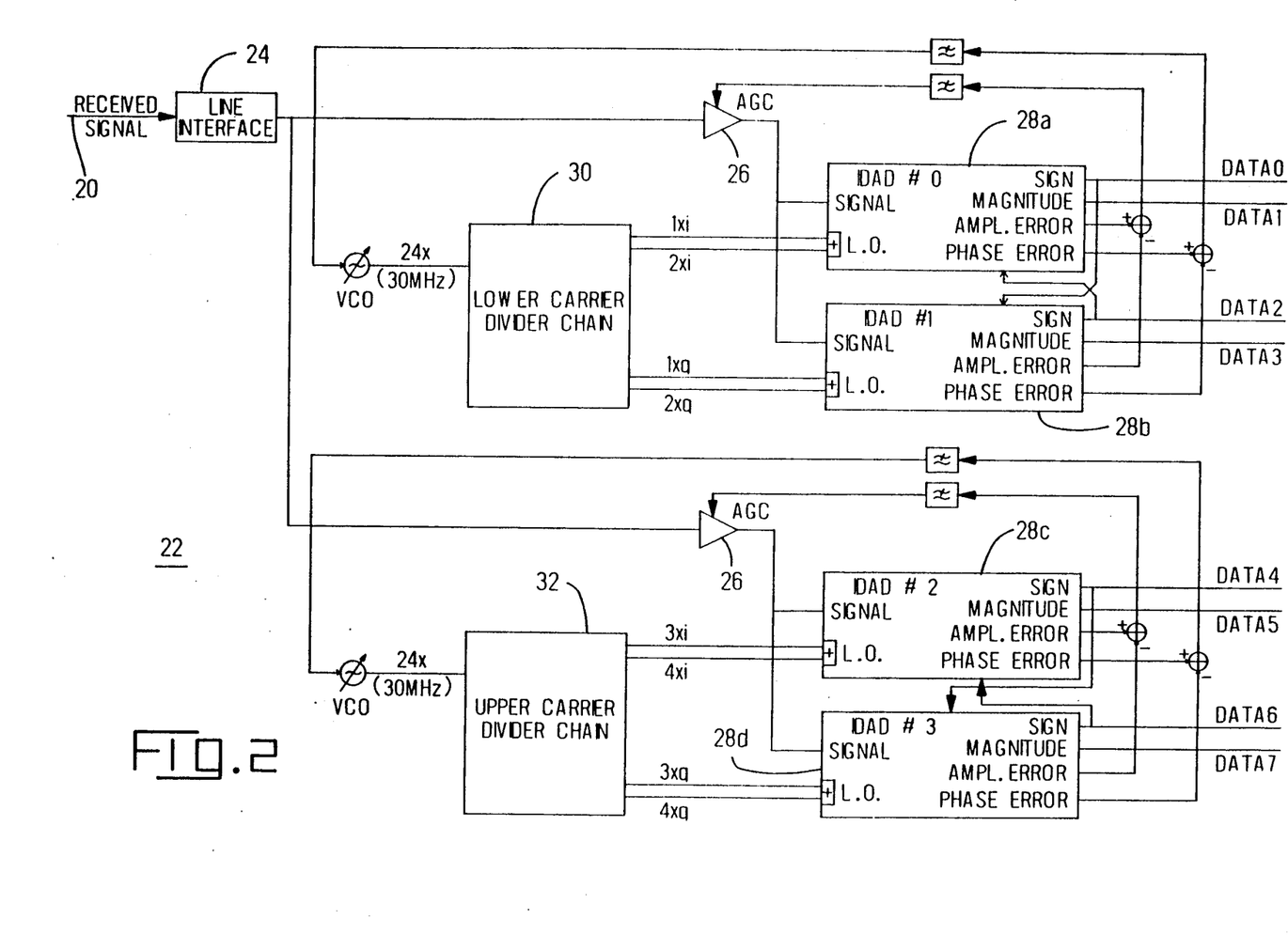
FIG. 2 is a block diagram of a receiver which responds to a composite signal generated by the transmitter of FIG. 1, and which incorporates a presently preferred embodiment of this invention.

FIG. 2 shows a block diagram of a digital demodulator or receiver 22 which incorporates a presently preferred embodiment of this invention. This receiver 22 is coupled to the twisted pair 20 via a line interface 24. The output of the line interface 24 is applied in parallel via automatic gain control amplifiers 26 to four IDAD's 28a–28d. In this connection, IDAD is an acronym for Integrate-Dump-Analog-to-Digital. In general, each of the IDAD's 28a–28d multiplies the received composite signal by a respective local oscillator signal L0, integrates the resulting product signal over an integral number of symbol periods, and then performs a two bit A-D conversion to decode two data bits from the resulting integrated value. The local oscillator signals for the two lower frequency IDAD's 28a, 28b are synthesized from logic signals directly generated by a lower carrier divider chain 30, and the local oscillator signals for the two higher frequency IDAD's 28c, 28d are synthesized from logic signals directly generated by an upper carrier divider chain 32.

Figure 3:
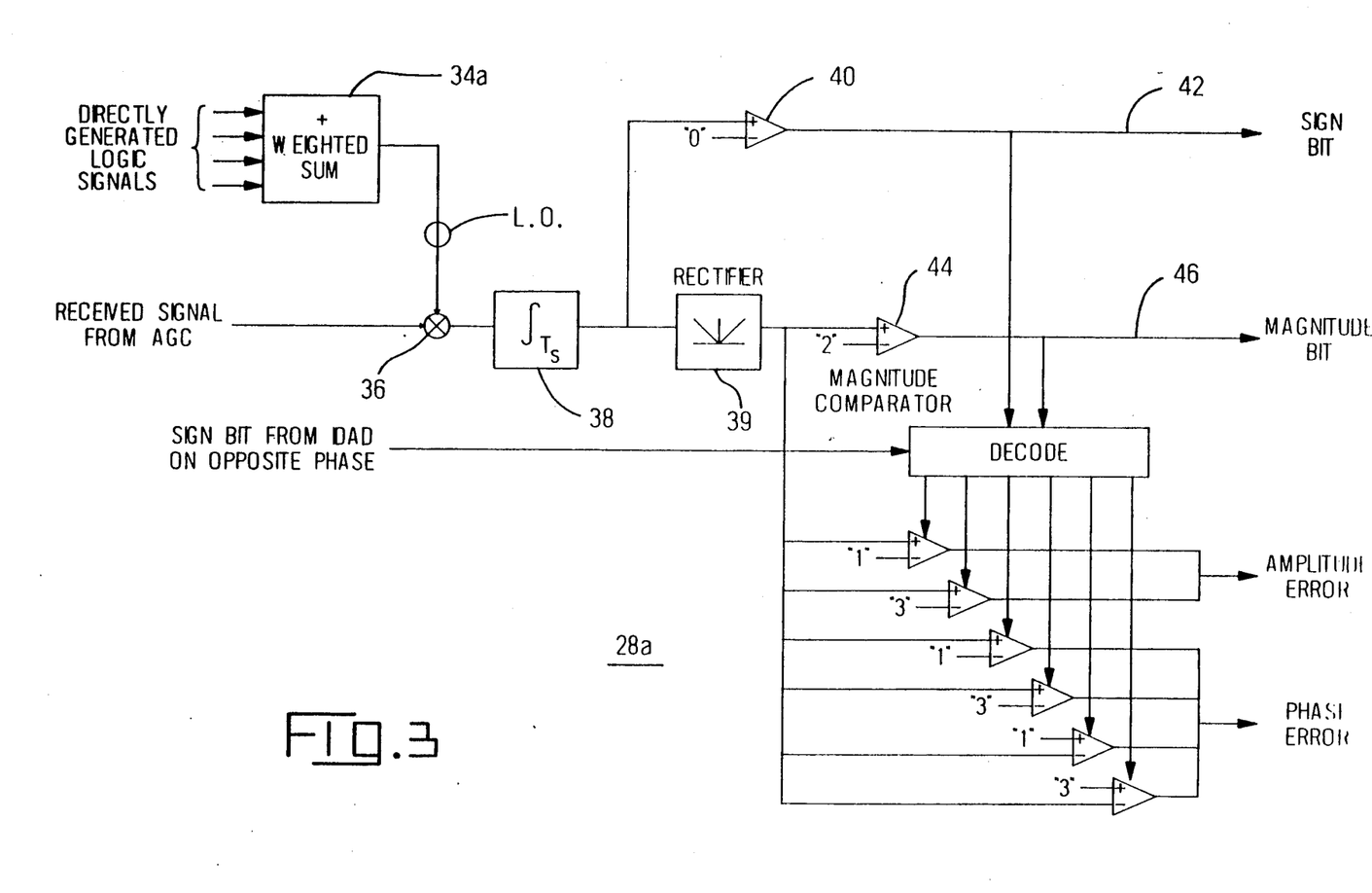
FIG. 3 is a block diagram of one of the IDAD's included in the transmitter of FIG. 2.

The four IDAD's 28a–28d are identical at the block diagram level, and FIG. 3 shows a block diagram of the one of the IDAD's 28a. As shown, a plurality of directly generated logic signals from the divider chain 30 are summed in a weighted sum circuit or summer 34a to produce a local oscillator signal LO which is multiplied with the received composite signal at a multiplier 36. The resulting product signal is integrated in an integrator 38 over a symbol period (800 nanoseconds in this embodiment). The resulting integrated value is then applied to a sign comparator 40 which generates a sign bit on line 42 in accordance with whether the integrated value is positive or negative. The integrated value is also rectified in rectifier 39 and then applied as an input to a magnitude comparator 44 which applies a signal on line 44 indicative of whether the magnitude is greater or less than two. The signals on lines 42, 46 represent sign and magnitude bits. The remaining elements of FIG. 3 relate to features of the IDAD not pertinent to the present invention, and will not be described here.

In order for the IDAD to function properly it is important that the four local oscillator signals L0 used in the four IDAD's be mutually orthogonal, and that their waveforms be chosen such that integration over a symbol period of the product of the composite signal with the local oscillator signal will result in an integrated value corresponding to one of the four input data signals D1–D4. In addition, during signal acquisition it is important that the phase angle of the local oscillator signals L0 be quickly adjustable to correspond to the phase angle of the composite signal received on the twisted pair 20. The present invention is directed to an improved apparatus for generating the local oscillator signals LO used in the four IDAD's 28a–28d. The remaining portions of the receiver 22 have been described only generally, because they do not per se form part of this invention.

According to this invention, the lower and higher carrier divider chains 20, 32 include means for directly generating a plurality of logic waveforms, each having a respective phase. Because the logic waveforms are directly generated, the phase can readily be changed, as for example during signal acquisition. The local oscillator signals L0 for the four IDAD's 28a–28d are directly synthesized by the weighted sum circuits 34a–34d from the logic signals generated by the lower and higher carrier divider chains 30, 32.

Figure 4A:
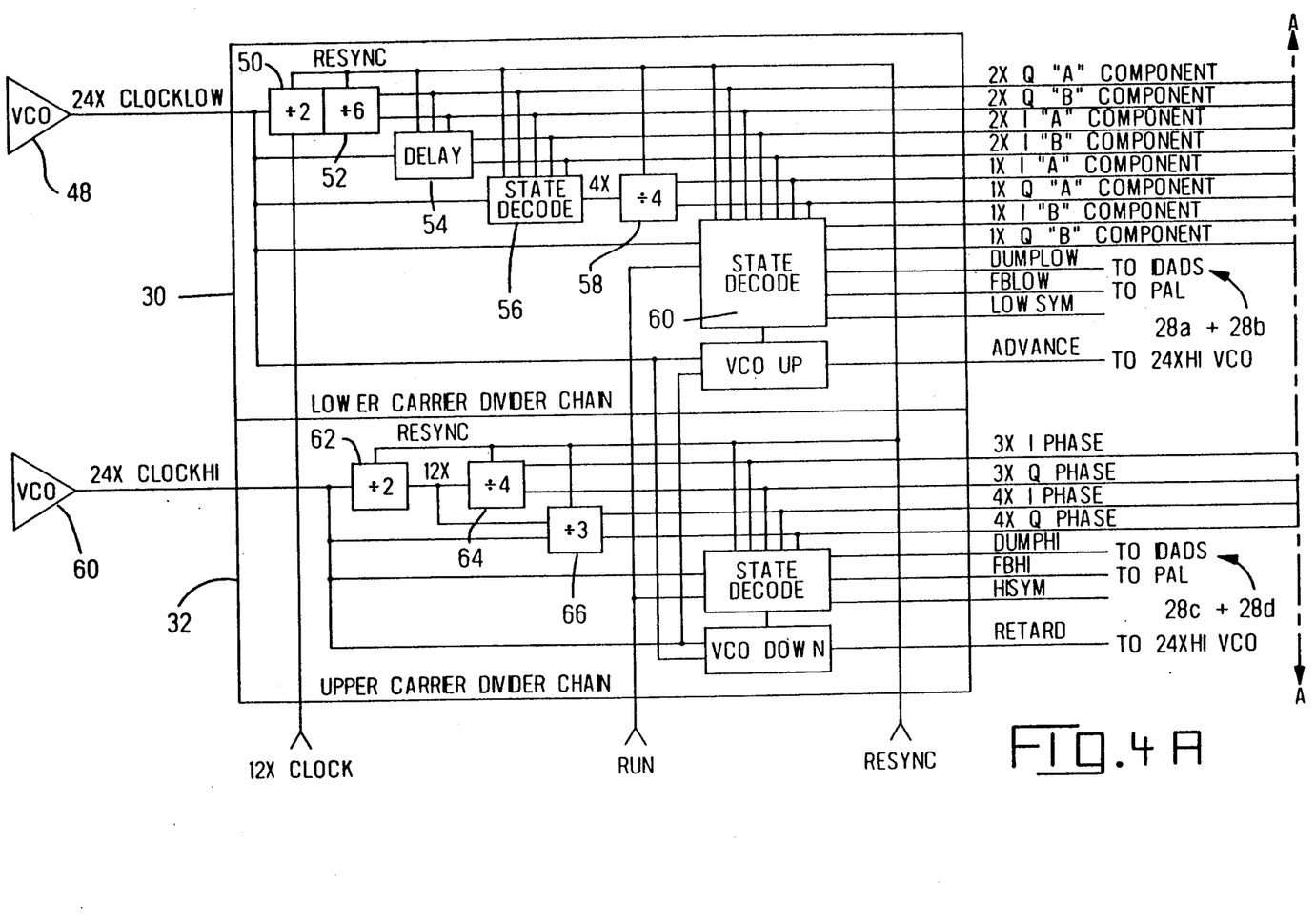
FIGS. 4A and 4B are is an expanded block diagram of selected components of the receiver of FIG. 2.
Figure 4B:
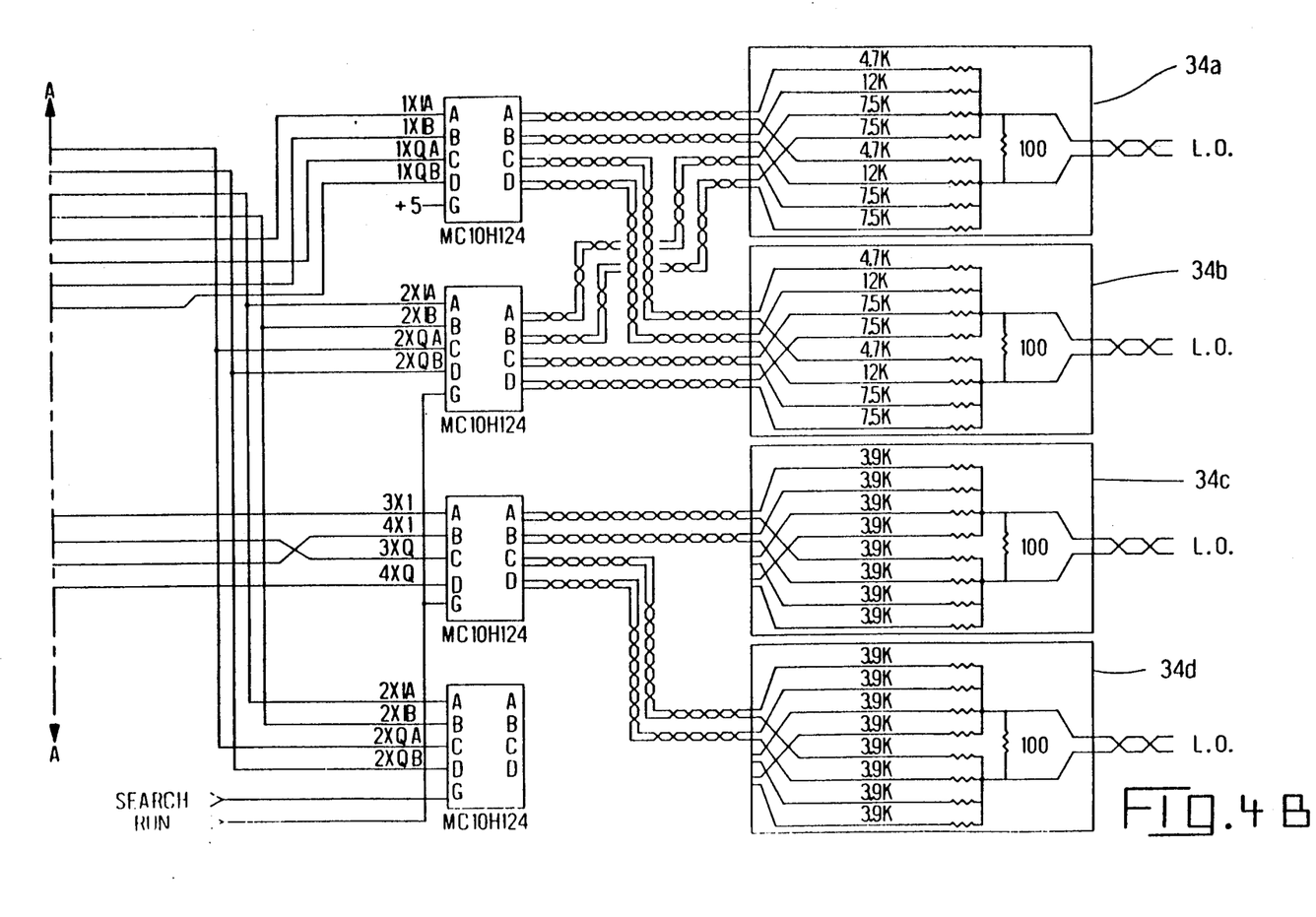
Figure 5:
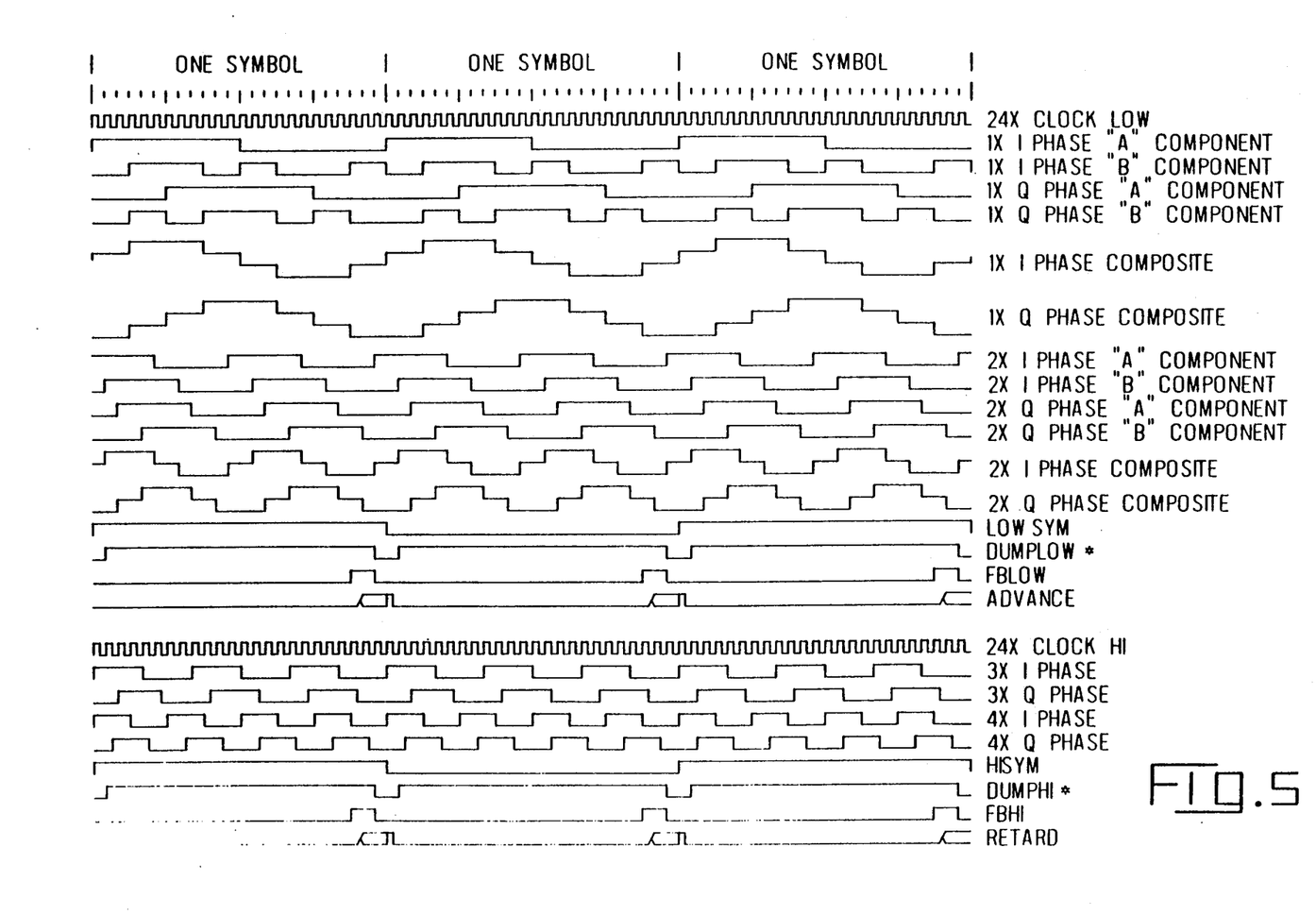
FIG. 5 is a waveform diagram of waveforms generated by the circuit of FIG. 4.

FIG. 4 shows in block diagram form the two divider chains 30, 32 and the resistor networks 34a–34d of the IDAD's 28a–28d. The lower carrier divider chain 30 is responsive to a 24x clock signal generated by a voltage controlled oscillator 48. This clock signal is divided by twelve by dividers or counters 50, 52 to generate the logic signal components 2xqa and 2xqb as shown in FIG. 5. These signals are delayed by the delay circuit 54 to generate the logic signal components 2xia and 2xib, also as shown by FIG. 5. A state decoder circuit 56 and a divide by four circuit 58 in turn generate the 1xia and the 1xqa logic signal components as shown in FIG. 5. Finally, the state decoding circuit 60 generates the 1xib and the 1xqb logic signal components as shown in FIG. 5.

Similarly, the divider chain 32 is responsive to a 24x clock generated by a voltage controller oscillator 60 and includes divider or counter circuits 62, 64 which generate 3xi and 3xq logic signals as shown in FIG. 5. A divide by three circuit 66 generates 4xi and 4xq logic signals, also as shown in FIG. 5.

Appropriate ones of the logic signals generated by the circuitry of FIGS. 4a and 4b are summed by resistor networks 34a–34d to generate the four local oscillator signals LO required for operation of the IDAD's 28a–28d. Though simple resistor networks are shown, those skilled in the art will recognize other means can be used to perform the summing function.

Figure 6A:
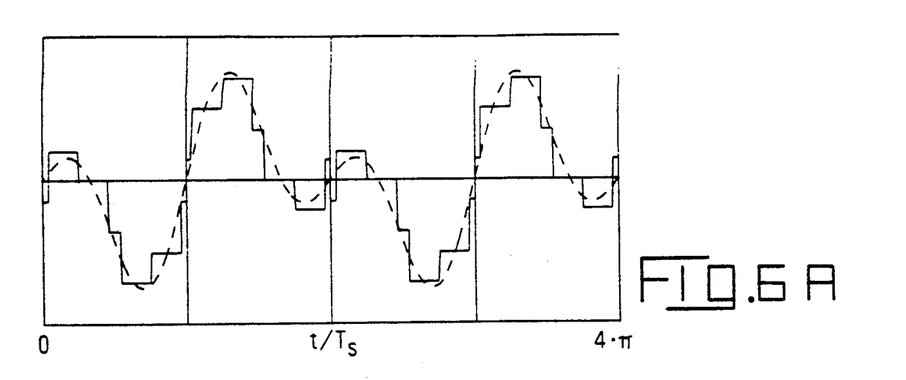
FIGS. 6a-6d are waveforms of four local oscillator signals generated by the circuits of FIGS. 3 and 4.

The resistor networks 34a–34d sum selected ones of the logic signals to generate the four local oscillator signals shown in FIGS. 6a–6d. In FIGS. 6a–6d the respective ideal, sinusoidally varying waveforms that are being approximated are shown as dot-dash lines. These ideal waveforms are defined as follows:

FIG. 6a: $2\cos(1.5x)\sin(x/2) = \sin 2x - \sin 1x$

Figure 6B:
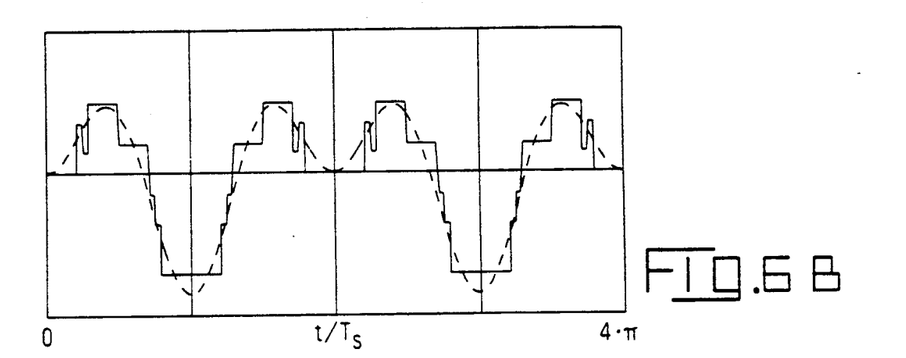

FIG. 6b: $2\sin(1.5x)\sin(x/2) = \cos 1x - \cos 2x$

Figure 6C:
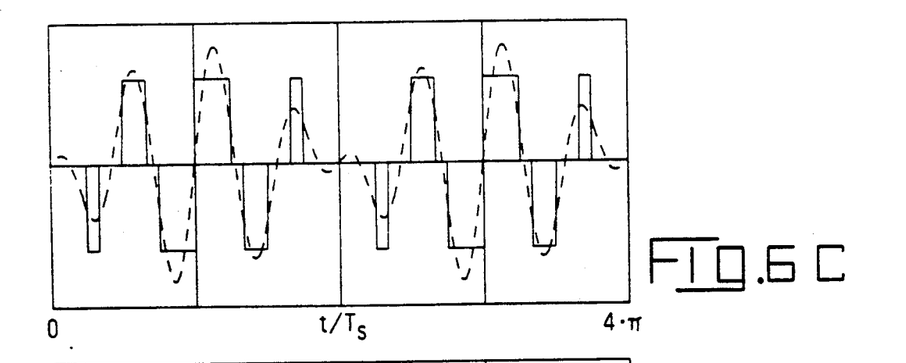

FIG. 6c: $2 \cos(3.5x) \sin(x/2) = \sin 4x - \sin 3x$

Figure 6D:
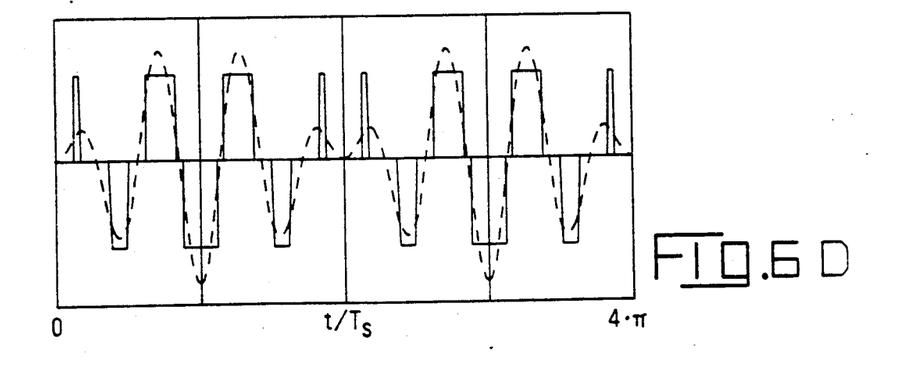

FIG. 6d: $2 \sin(3.5x) \sin(x/2) = \cos 3x - \cos 4x$

The presence of 2x in the first two waveforms, and hence in the step approximation waveforms, is important for proper operation of the current embodiment, but is not required for all embodiments of this invention.

As shown in FIG. 6a, the local oscillator signal for the IDAD 28a is created by summing four directly generated logic signals weighted as follows:

| Component | Weight |
| --- | --- |
| 1xia | 1 |
| 1xib | $(\sqrt{2}) - 1$ |
| 2xia | $(\sqrt{2})/2$ |
| 2xib | $(\sqrt{2})/2$ |

The local oscillator signal for the second IDAD 28b is shown in FIG. 6b. It too is the result of the summation of four directly generated logic signals weighted as follows:

| Component | Weight |
| --- | --- |
| 1xqa | 1 |
| 1xqb | $(\sqrt{2}) - 1$ |
| 2xqa | $(\sqrt{2})/2$ |
| 2xqb | $(\sqrt{2})/2$ |

FIG. 6c shows the local oscillator for the IDAD 28c which is generated as an equally weighted sum of two directly generated logic signals 3xi and 4xi. FIG. 6d shows the local oscillator signal for the IDAD 28d which is generated as the equally weighted sum of two directly generated logic signals 3xq and 4xq.

It is important to note that the four local oscillator signals shown in FIGS. 6a-6d, even though rough approximations of sinusoidally varying signals, nevertheless have been carefully selected to minimize undesired harmonics. With respect to the local oscillator signals of FIGS. 6a and 6b, the component waveforms and their weights are chosen such that the third, fourth, fifth and sixth harmonics of 1x and the second and third harmonics of 2x are zero. Thus, the spectrum of the step approximation shown in the FIGS. 6a and 6b matches that of the ideal sinusoidally varying local oscillator signal below 7x. With respect to the local oscillator signals shown in FIGS. 6c and 6d, the lowest harmonic present is the third harmonic of 3x, and for this reason the spectrum of the step approximation shown in FIGS. 6c and 6d matches that of the ideal, sinusoidally varying local oscillator signal below 9x.

In this embodiment, the third and fourth harmonic components of the directly synthesized local oscillator signals of FIGS. 6a and 6b are at least 30 dB less than that of the fundamental component, and the fifth harmonic component is also markedly reduced. In the absence of circuit implementation imperfections, the harmonic components at 3x, 4x, 5x and 6x would all be exactly zero. This desirable result is achieved through proper selection of the amplitudes and timing of the component logic signals. The local oscillator signals of FIGS. 6a and 6b are characterized by at least three discrete amplitudes, and adjacent ones of these discrete amplitudes differ in amplitude by amplitude differentials selected such that at least two of the differentials differ from one another. Another important feature of the local oscillator signals of FIGS. 6a and 6b is that the transitions between the discrete amplitudes are separated from one another by time periods, and at least one of the time periods differs in duration from another one.

Returning now to FIGS. 4a and 4b, the divider chains 30, 32 each include a RESYNC conductor which is coupled to the counters 50, 52, 58, 62, 64, 66, and state decoding circuits 56, 60. This RESYNC conductor carries a synchronization signal which, when present, is effective to reset the counters. Thus, by simply setting the synchronization signal, the phase of the logic signals generated by the divider chains 30, 32 can be adjusted quickly and precisely. This is a direct consequence of the fact that filtering, smoothing or integration circuits are not used to generate or process the directly generated logic signals of the divider chains 30, 32. This synchronization signal in effect alters the counts by resetting the counters to alter the phase of the logic waveforms.

Figures 7, 7A:
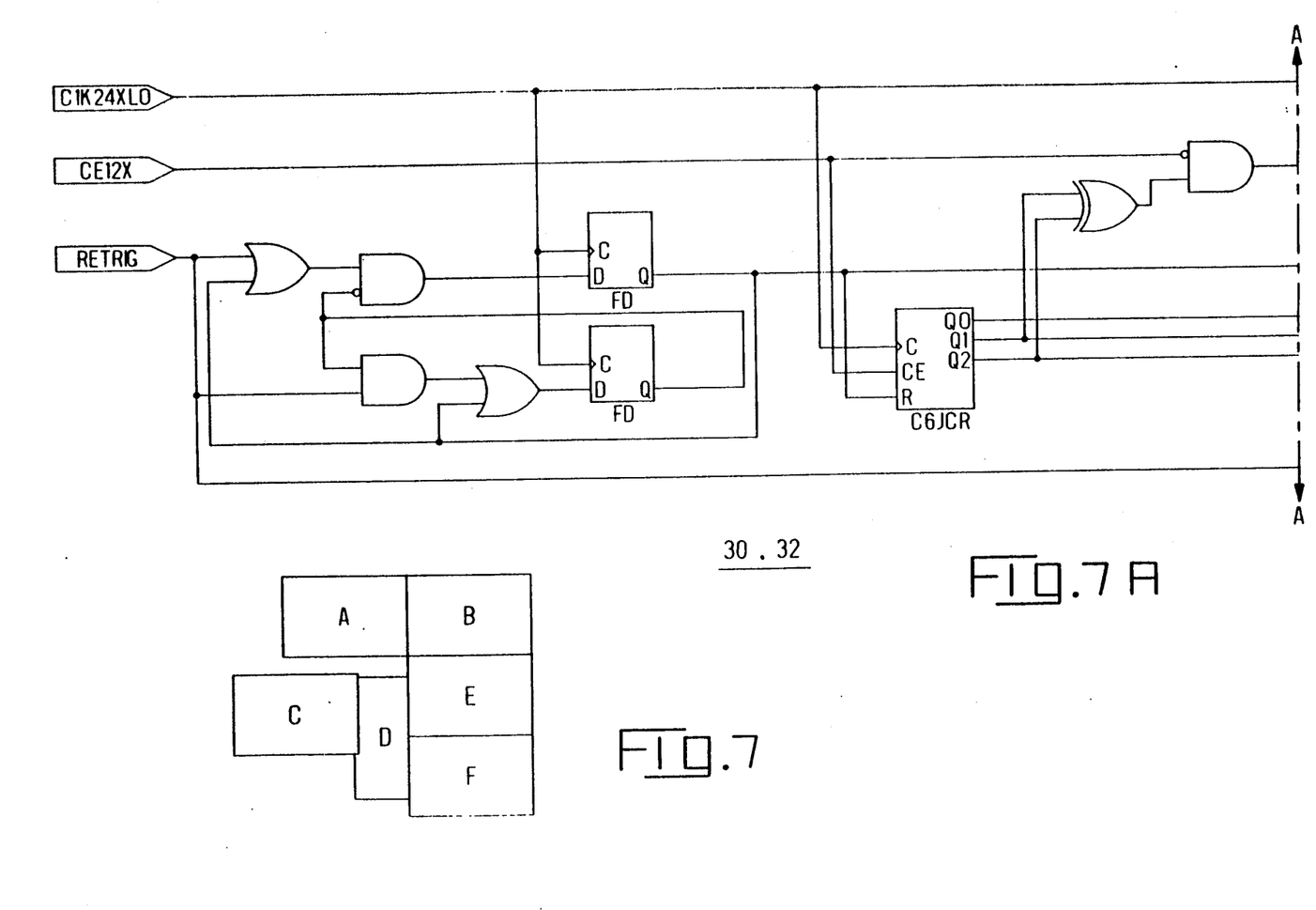
FIG. 7 is a schematic diagram showing the configuration of FIGS. 7A-7F.
FIGS. 7A-7F are a schematic diagram of components shown in FIG. 4.
Figure 7B:
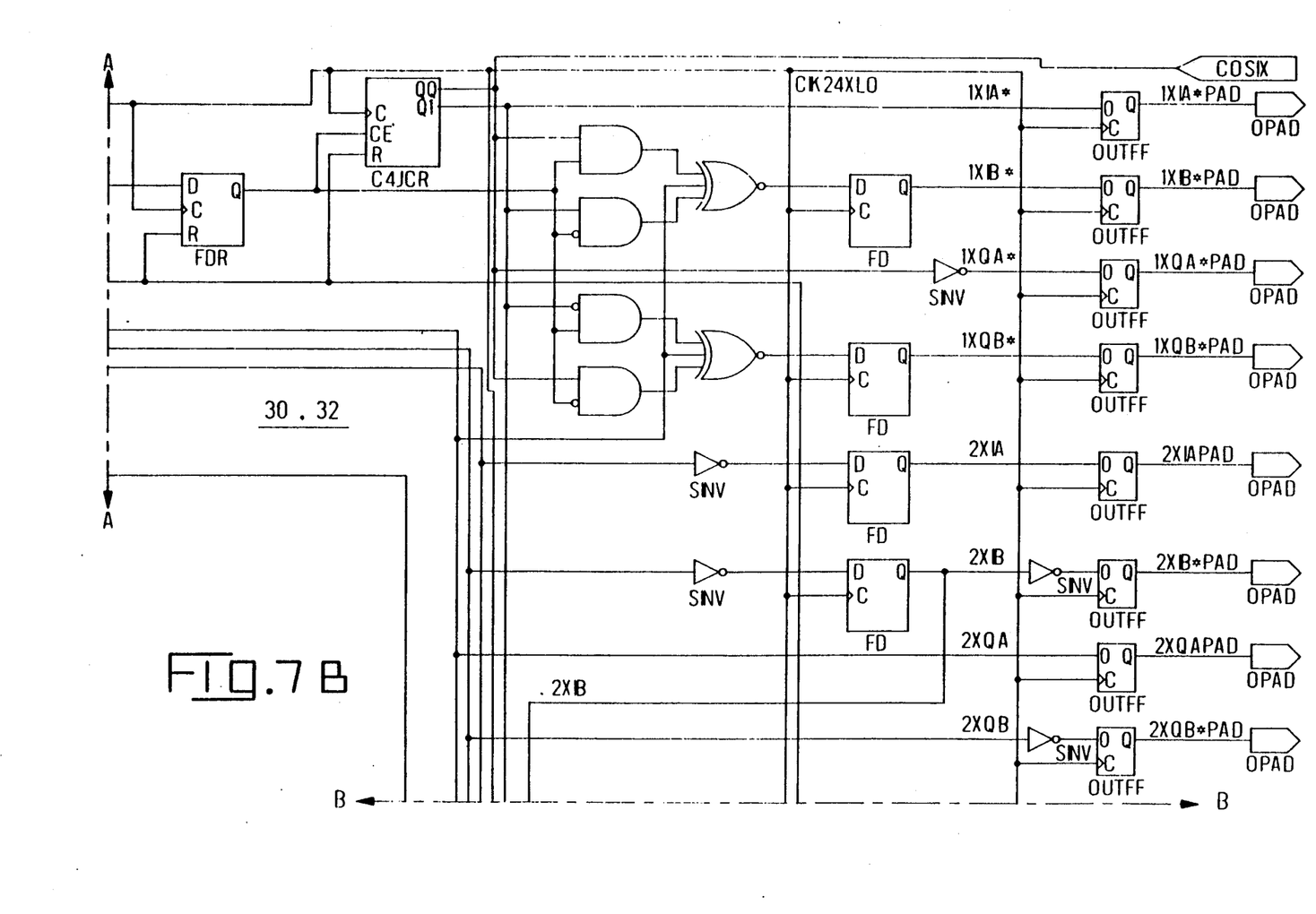
Figure 7C:
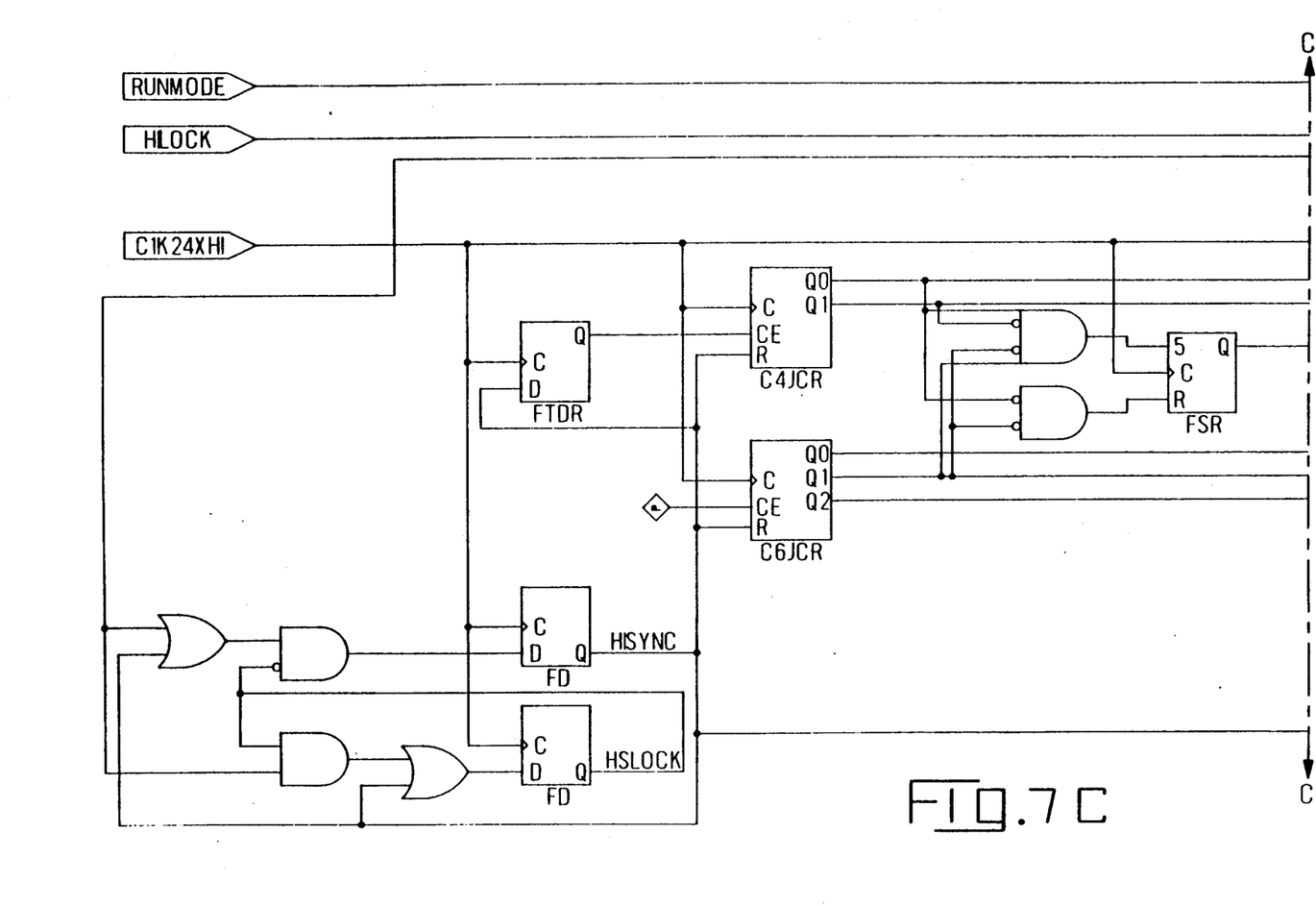
Figure 7D:
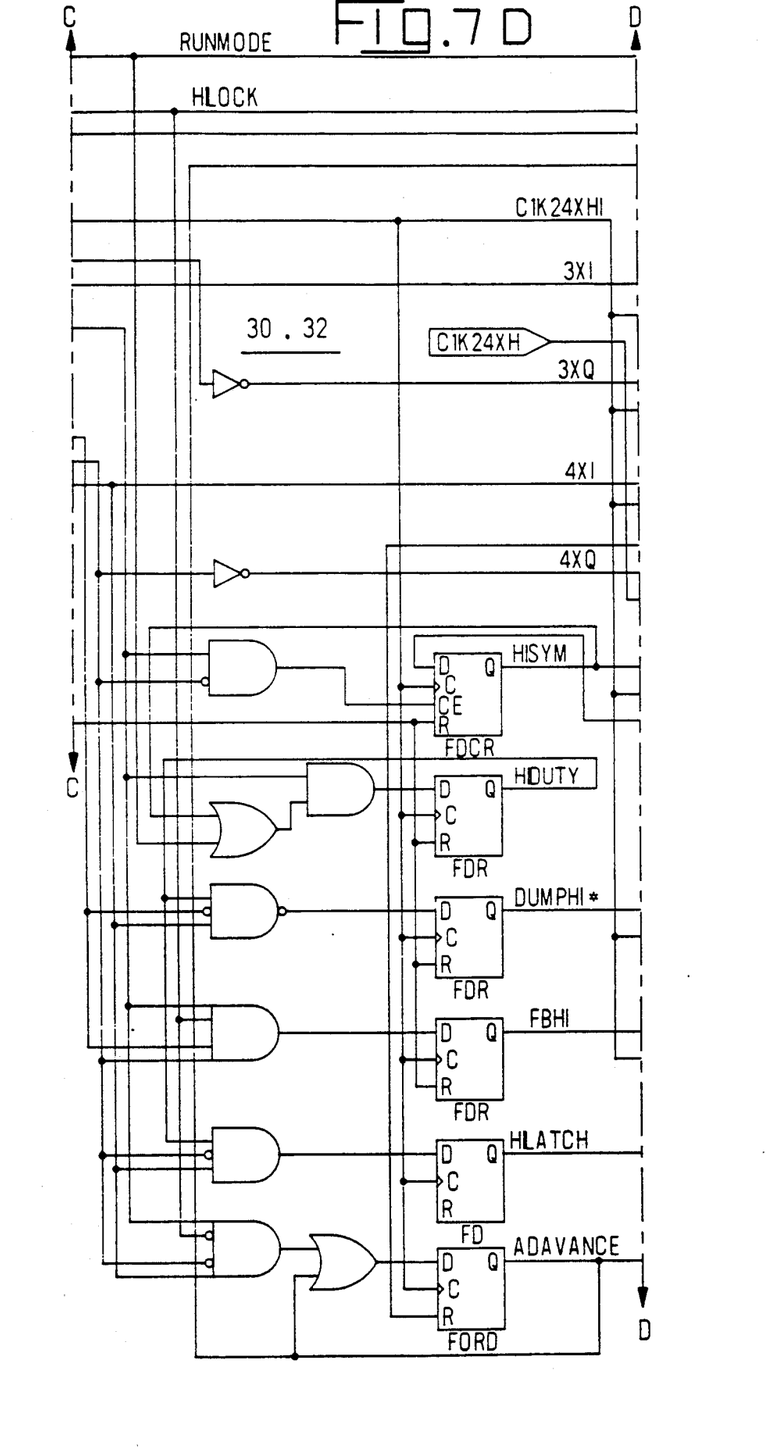
Figure 7E:
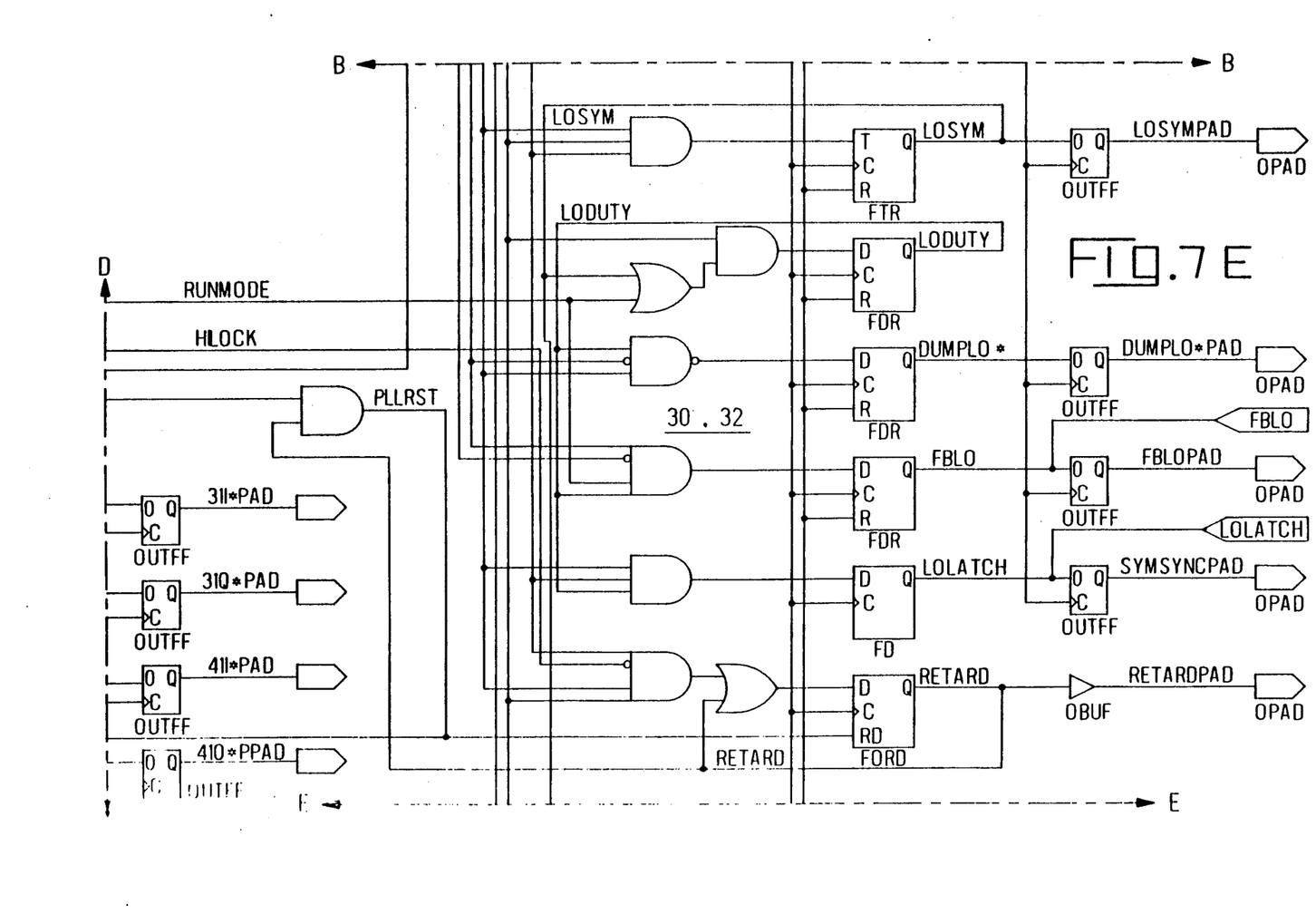
Figure 7F:
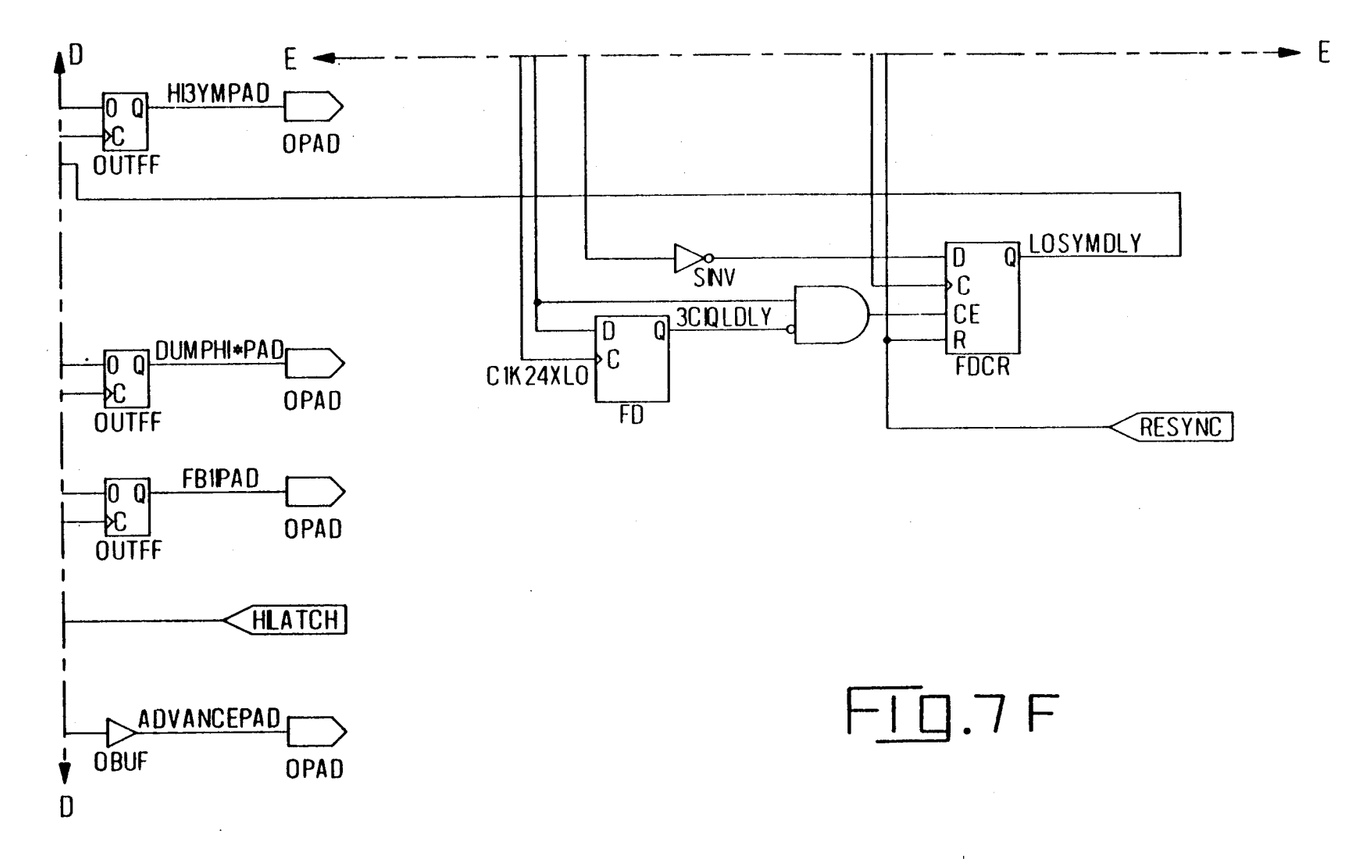

FIG. 7 shows a schematic diagram of the divider chains 30, 32, and this figure discloses the best mode presently known to the inventors for carrying out this invention. This diagram was prepared using XYLINX schematic to LCA conversion software (X3000 Library, ORCAD interface). During normal operation the RUNMODE and the HILOCK inputs are in the logic high state.

From the foregoing it should be apparent that an improved apparatus has been disclosed for generating local oscillator signals which approximate the desired sinusoidally varying signals well enough to suppress or eliminate undesired harmonics, yet which are directly generated in a manner that facilitates high speed adjustment of the phase of the local oscillator signals during signal acquisition.

It should be understood that the foregoing detailed description is illustrative and not limiting, and that the present invention is defined by the following claims.

I claim:

1. In a digital demdoulator of the type comprising means for receiving an input signal modulated with digital data, means for multiplying the received input signal with a local oscillator signal to generate a product signal, and means for periodically integrating the product signal to generate a sequence of integrated signals, each having an amplitude indicative of a respective portion of the digital data, the improvement comprising:

means for directly generating a plurality of logic signals, each having a respective phase;

mens for producing a weighted sum of the logic signals to directly synthesize the local oscillator signal;

said local oscillator signal having a fundamental component and third and fourth harmonic components, said directly generating means and said weighted sum producing means operative to ensure that each of the third and fourth harmonic components has an amplitude substantially less than that of the fundamental component; and means for quickly altering phase of the local oscillator signal by modifying operation of the directly generating means to alter the phase of the logic signals.

2. The invention of claim 1 wherein the local oscillator signal approximates a smoothly varying signal having a plurality of sinusoidally modulated components.

3. The invention of claim 1 wherein the directly generating means comprises:

means for generating a clock signal having a clock frequency; and means for frequency dividing the clock signal to generate each of the logic signals with a respective frequency equal to a fraction of the clock frequency.

4. The invention of claim 3 wherein the dividing means comprises a plurality of counters, each storing a respective count, wherein, at least some of said counters are clocked by the clock signal.

5. The invention of claim 4 wherein the means for quickly altering phase comprises means for altering the counts to alter the phase of the logic signals.

6. The invention of claim 5 wherein the means for altering the counts comprises means for resetting the counters to alter the phases of the logic signals.

7. The invention of claim 1 wherien said directly generating means and said weighted sum producing means are operative to ensure that each of the third and fourth harmonic components has an amplitude at least about 30 dB less than that of the fundamental component.

8. The invention of claim 1 wherein said local oscilaltor signal additionally comprises a fifth harmonic component and wherein said directly generating means and said weighted sum producing means are additionally operative to ensure that the fifth harmonic component of the local oscillator signal has an amplitude substantially less than the fundamental component.

9. The invention of claim 1 wherein the local oscillator signal is characterized by at least three discrete amplitdues, wherein the discrete amplitudes which are adjacent one anotehr in amplitude differ in amplitude by respective amplitude differentials, and wherein at least one of the amplitude differentials differs in magnitude from another one of the amplitude differentials.

10. The invention of cliam 1 wherein the local oscillator signal is characterized by at least three discrete amplitudes separated by respective transitions, wherein adjacent transistions are separated from one another by respective time periods, and wherein at least one of the time periods differs in duration from another one of the time periods.

11. In a digital demdoulator fo the type comprising an interface operative to receive an input signal modulated with digital data and to generate a received input signal, a multiplier operative to multiply the received input signal with a local oscillator signal to generate a product signal, and an integrator operative to integrate the product signal periodically to generate a sequence of integrated values, each having an amplitude indicative of a respective portion of the digital data, the improvement comprising:

a logic circuit operative to generate a plurality of logic signals, each having a respective phase;

a summer operative to sum the logic signals to directly synthesize the local oscillator signal, said local oscillator signal having a fundamental component and third and fourth harmonic components;

said logic signals and summer selected to ensure that each of the third and fourth harmonic components has an amplitude substantially less than that of the fundamental component;

said logic circuit being resettable to quickly alter the phase of the logic signals and thereby of the local oscillator signal.

12. The invention of claim 11 wherein the local oscillator signal approximates a smoothly varying signal having a plurality of sinusoidally modulated components.

13. The invention of claim 22 wherein the logic circuit comprises:

means for generating a clock siganl having a clock frequency; and means for frequency dividing the clock signal to generate each of the logic signals with a respective frequency equal to a fraction of the clock frequency.

14. The invention of claim 13 wherein the dividing means comprises a plurality of counters, each of which stores a respective count, wherein at least some of the counters are clocked by the clock signal.

15. The invention of claim 11 wherein each of the third and fourth harmonic components has an amplitude at least about 30 dB less than that of the fundamental component.

16. The invention of claim 15 wherein said local oscillator signal additionally comprises a fifth harmonic component, and wherein the fifth harmonic component is substantially less than the fundamental component in amplitude.

17. The invention of claim 11 wherein the local oscillator signal is characterized by at least three discrete amplitudes, wherein the discrete amplitudes which are adjacent one another in amplitude differ in amplitude by respective amplitude differentials, and wherein at least one of the amplitude differentials differs in magnitude from another one of the amplitude differentials.

18. The invention of claim 11 wherein the local oscillator signal is characterized by at least three discrete amplitudes separated by respective transitions, wherein adjacent transitions are separated from one another by respective time periods, and wherein at least one of the time periods differs in duration from another one of the time periods.

* * * * *